Nov. 22, 1955   R. S. COFFIN   2,724,361
YARDAGE INDICATOR
Filed Jan. 12, 1953

INVENTOR.
ROBERT S. COFFIN
BY
Knox & Knox
AGENTS

United States Patent Office 2,724,361
Patented Nov. 22, 1955

2,724,361

YARDAGE INDICATOR

Robert S. Coffin, San Bernardino, Calif.

Application January 12, 1953, Serial No. 330,812

1 Claim. (Cl. 116—129)

The present invention relates generally to a yardage indicator and more particularly to a yardage indicator for use on golf carts and is a continuation in part of applicant's previous application Serial No. 53,581, filed October 8, 1948, now abandoned.

The primary object of this invention is to provide a yardage indicator suitable for use on golf carts which may be used to determine the distance between various locations on a golf course.

Another object of this invention is to provide a yardage indicator having a resilient measuring wheel which is frictionally engaged with the tread of the tire on one wheel of the golf cart, the diameter of the ground-contacting wheel being immaterial, and the resiliency of the measuring wheel greatly improving the accuracy of distance measurement.

Another object of this invention is to provide a yardage indicator having an indicating dial which is provided with a pointer geared to the measuring wheel so that the distance travelled by the periphery of the wheel may be read directly from the dial in yards.

Another object of this invention is to provide a yardage indicator in which the indicating pointer is easily reset to zero on the dial after reading the required distance.

Another object of this invention, ancillary to the preceding objects, is to teach the best known mode of implementing the principles of the invention in carrying the invention into actual practice.

Another object of this invention is to provide a yardage indicator which is adapted for fabrication from many different materials, so that the choice of material can be according to the dictates of availability and price considerations, the exact sizes and proportions being matters easily determined to suit particular conditions and needs.

Another object of this invention is to provide a yardage indicator which is inexpensive and practicable to manufacture.

Finally, it is an object to provide a yardage indicator of the aforementioned character which is simple, safe and convenient to operate, and which will give generally efficient and durable service.

With these and other objects definitely in view, this invention consists in the novel construction, combination and arrangement of elements and portions, as will be hereinafter fully described in the specification, particularly pointed out in the claim, and illustrated in the drawing which forms a material part of this disclosure and wherein similar characters of reference indicate similar or identical elements and portions throughout the specification and throughout the views of the drawing and in which:

Figures 1, 2, 3, 4, 5:
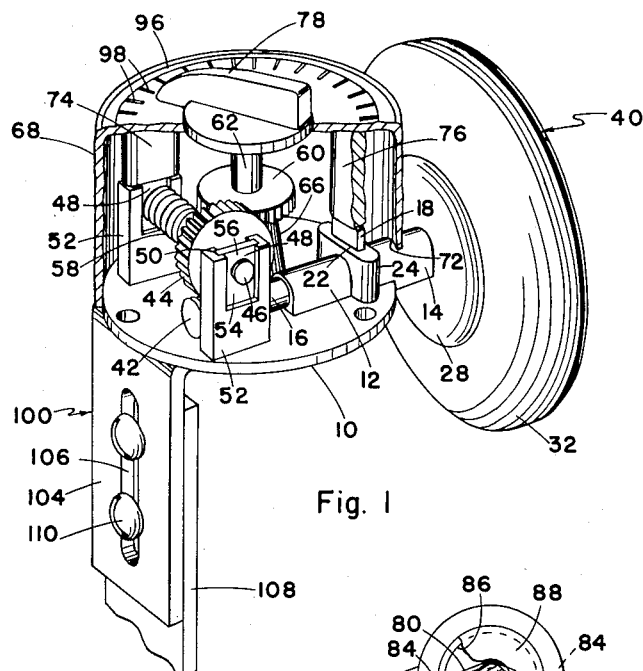
Fig. 1 is a perspective view of the device with the cover partially sectioned to reveal the mechanism.
Fig. 2 is a vertical sectional view of the device.
Fig. 3 is a sectional view taken on the line 3—3 of Fig. 2.
Fig. 4 is a fragmentary vertical sectional view of the measuring wheel.
Fig. 5 is a fragmentary end elevation view of the device attached to a golf cart.

Referring now to the drawing in detail, the device comprises a base plate 10 on which is mounted a bearing housing 12, said bearing housing extending from said base plate as indicated at 14. The bearing housing 12 supports the drive shaft 16 which is retained in longitudinal alignment in said bearing housing by a key 18 engaging a circumferential groove 20 in said drive shaft. The key 18 is slidably fitted into the slot 22 of a key block 24 which is constructed integrally with the bearing housing 12 as illustrated in Fig. 1.

The end of the drive shaft 16, protruding from the bearing housing extension 14, is provided with a shoulder 26 to act as a stop for the wheel disc 28 which is fitted on said drive shaft. The wheel disc 28 has a sleeve 30 which projects inwardly into the tire 32, said tire being retained in position by a further wheel disc 34 which is provided with a sleeve 36, also projecting inwardly into said tire as illustrated in Fig. 4, said sleeve 36 being internally screw threaded to engage with the screw threaded end 38 of the drive shaft 16. The wheel disc 28, the wheel disc 34 and the tire 32 constitute the measuring wheel 40. The remaining end of the drive shaft 16 is provided with a worm 42 which engages a worm gear 44, said worm gear being carried on a shaft 46 which is supported at both ends by means of bearing plates 48. The bearing plates 48 are slidably fitted into slots 50 in the support blocks 52 which are secured to, or constructed integrally with, the base plate 10 as illustrated in Fig. 1. It should be noted that the shaft 46 is eccentrically located in the bearing plates 48, the ends 54 being slightly longer than the ends 56. Thus the bearing plates may be inserted into the slots 50 as shown or may be inverted in order to adjust the height of the shaft 46 and obtain correct meshing of the worm gear 44 with the worm 42, so allowing for minor discrepancies in the structure of the base plate and support blocks.

The shaft 46 is provided with a worm 58 which engages a worm gear 60, said worm gear being attached to a shaft 62 which is rotatably mounted in the socket 64 of a bearing pillar 66 extending upwardly from the center of the base plate 10. The mechanism of the device is protected by a cover 68 which fits around the base plate 10 and is secured thereto by means of screws 70, said cover having a suitable opening 72 which fits over the bearing housing extension 14. The cover 68 is provided with two retaining lugs 74 which project downward in alignment with the support blocks 52 and serve to retain the bearing plates 48 securely in place, said cover also having a further retaining lug 76 which extends downwardly over the key block 24 and retains the key 18 so that the drive shaft 16 is held in position.

The shaft 62 extends upwardly through the cover 68 and is fitted with a pointer 78 secured to said shaft by a spring 80 which engages the circumferential groove 82 in said shaft. The spring 80 is retained at both ends in recesses 84 which are diametrically opposed in the counterbore 86 so that said spring is bowed around the shaft 62 and retained firmly in the groove 82. The spring 80 is held within the pointer 78 by a retaining disc 88 which is fitted tightly into a further counterbore 90 in the lower side of said pointer. In order to facilitate the assembly of the pointer 78 on the shaft 62, the retaining disc 88 is provided with an elongated hole 92 so that said shaft may be inserted alongside the spring 80, then forced into alignment with the socket and finally pushed into said socket until said spring falls into the groove 82.

The top face of the cover 68 is provided with a dial 96 calibrated as at 98 in yards so that the position of the pointer 78 will indicate distance as hereinafter explained.

The device is fastened to an angle bracket 100 by means of screws 102 which are threadably engaged in the base plate 10. The angle bracket 100 has a downwardly projecting arm 104 provided with a slotted hole 106, said angle bracket being fastened to a support bracket 108 by means of screws 110 passing through said slotted hole which allows for vertical adjustment of the device.

The support bracket 108 is fastened in a suitable position on a golf cart 112 which is fragmentarily shown in Fig. 5. The device is then adjusted until the measuring wheel 40 is in frictional contact with one of the ground-contacting wheels 114 of the golf cart 112. These wheels always have resilient tires and the tread of one of these tires is indicated at 116.

As the golf cart is pushed along, the rotation of the wheel 114 will cause the measuring wheel to rotate, which in turn will rotate the pointer 78, it being obvious that the reduction gearing must be arranged so that said pointer indicates the actual distance travelled by the periphery of said measuring wheel.

The manner in which the pointer 78 is secured to the shaft 62, permits said pointer to be rotated independently of said shaft, although the spring 80 maintains sufficient pressure on the shaft to ensure that said knob is held in position to indicate a true reading when the device is operated. In other words, the spring 80 constitutes a frictional clutch which allows the pointer 78 to be set to zero on the dial 96 when required.

The device is extremely useful in assisting a golfer to play a successful game. For example, a golfer is about to play a 175 yard hole. Knowing this distance he can select the most suitable club for the shot and after making the shot, he may set the pointer on the yardage indicator to zero and push or pull the cart to the position at which the ball has come to rest. On reaching this position, he may read the distance travelled on the dial and thus calculate the remaining distance to the hole. Again, knowing the distance will greatly assist in the selection of the correct club for the subsequent shot.

If desired, the device may be arranged so that the indicator will operate in reverse. That is, the pointer may be set at the distance to be travelled and will gradually return to zero as the cart is pushed along, the direction of rotation of the measuring wheel being necessarily reversed. This reversal may be accomplished by pushing instead of pulling the golf cart, or alternatively, by attaching the yardage indicator to the other wheel.

The accuracy of the device will be improved if the tire 32 is of a soft, resilient nature so that said tire will be slightly flattened by contact with the wheel 114. Thus, any mud or foreign matter collected by the wheel 114, whether or not transferred to the tire 32, will merely result in a compensatory deformation of the tire as it rolls over the tread 116 of the ground-contacting wheel 114 and this foreign matter will be loosened and dropped as each portion of the tire returns to its normal shape after breaking contact with said wheel.

The operation of this invention will be clearly comprehended from a consideration of the foregoing description of the mechanical details thereof, taken in connection with the drawing and the above recited objects. It will be obvious that all said objects are amply achieved by this invention.

Further description would appear to be unnecessary.

It is understood that minor variation from the form of the invention disclosed herein may be made without departure from the spirit and scope of the invention, and that the specification and drawing are to be considered as merely illustrative rather than limiting.

I claim:

In a yardage indicator, an indicator drive shaft having a circumferential groove adjacent one end thereof, a pointer having a recess terminating in a socket for said end of said shaft, a spring terminally engaging opposing sides of said recess and extending thereacross with a portion of the spring in said groove and frictionally engaging said shaft, a disc closure for said recess, said disc closure having an elongated aperture to accommodate said shaft, whereby said pointer can be manually forcibly rotated relative to said shaft and whereby assembly of the pointer onto said shaft is facilitated since the elongated aperture allows initial insertion of said end of the shaft beside said spring.

References Cited in the file of this patent

UNITED STATES PATENTS

| Number | Name | Date |
| --- | --- | --- |
| 584,521 | Rich | June 15, 1897 |
| 643,095 | Holdrege | Feb. 6, 1900 |
| 919,776 | Sanford | Apr. 27, 1909 |
| 1,280,342 | Catucci | Oct. 1, 1918 |
| 1,670,836 | Berge | May 22, 1928 |
| 1,671,012 | Collins | May 22, 1928 |
| 1,672,195 | Berge | June 5, 1928 |
| 1,913,147 | Zubaty | June 6, 1933 |
| 1,960,862 | Baldwin | May 29, 1934 |
| 2,520,226 | Smith | Aug. 29, 1950 |

FOREIGN PATENTS

| Number | Country | Date |
| --- | --- | --- |
| 1,936 | Great Britain | Jan. 29, 1894 |